INVENTOR
GEORGE E. BARKER
BY
*Robert J. Schaap*
ATTORNEY

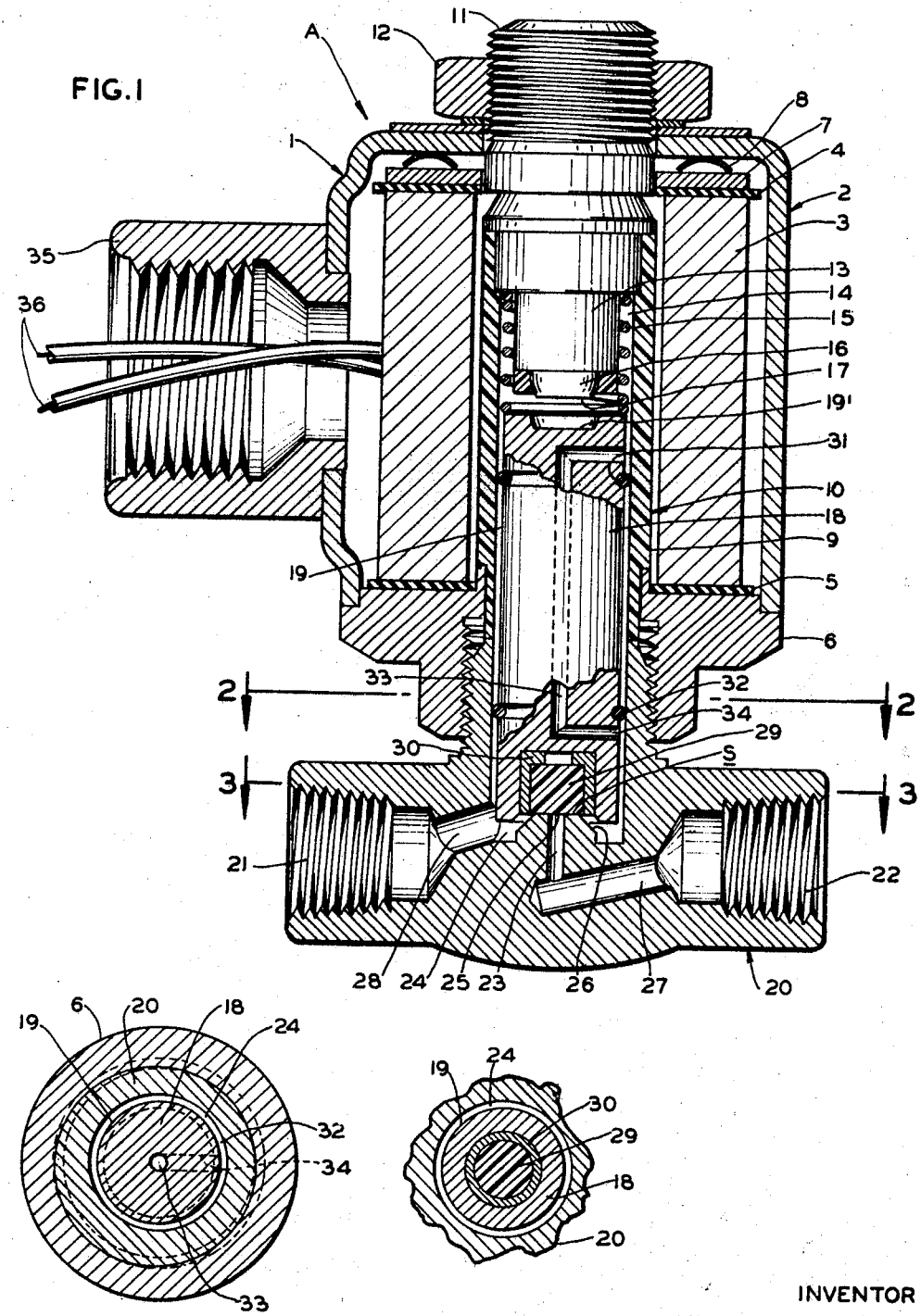

United States Patent Office 3,446,473
Patented May 27, 1969

---

3,446,473
PULSED SOLENOID CONTROL VALVES
George E. Barker, St. Louis, Mo., assignor to Monsanto Company, St. Louis, Mo., a corporation of Delaware
Continuation-in-part of application Ser. No. 412,921, Nov. 23, 1964. This application May 6, 1965, Ser. No. 453,707
Int. Cl. F16k *31/00, 31/02*
U.S. Cl. 251—64  14 Claims

ABSTRACT OF THE DISCLOSURE

A dithering solenoid actuated valve which comprises a valve housing and an internal sleeve forming a chamber for a dithering valve plunger. A solenoid coil is disposed around the sleeve for actuating the valve plunger in response to an external signal. A plurality of axially spaced guide rings are circumferentially disposed about the valve plunger and bear against the interior wall of the sleeve. The guide rings form a peripheral band of contact and flex for the distance that the valve plunger moves in its chamber so that a portion of the guide ring at the peripheral band of contact always remains in contact with the interior surface of the sleeve during the flexing movement thereof. This type of action substantially reduces both radial and undesirable vibratory action of the valve plunger.

---

Figure 5:
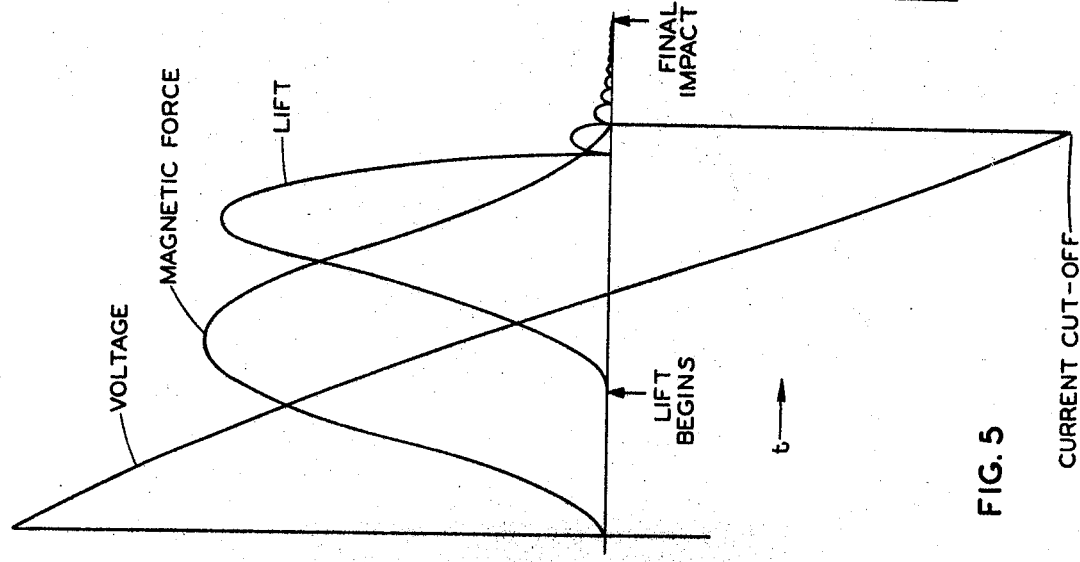

This application is a continuation in part of my copending application Ser. No. 412,921, filed Nov. 23, 1964, and which relates to electrically operated control valves.

This invention relates in general to certain new and useful improvements in control valves, and more particularly to an electrically operated valve control system which is capable of modulating action.

Recently, the use of electronic instrumentation has grown steadily in the chemical processing industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control valves, such as the air-motor control valve was a logical development in chemical processing instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure.

Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

It is, therefore, the primary object of the present invention to provide a pulsed solenoid control valve which is capable of controlling flow over a wide dynamic range.

It is another object of the present invention to provide a pulsed solenoid control valve of the type stated which is relatively simple in its operation and has a long operating life.

It is a further object of the present invention to provide a specific pulsed solenoid control valve which eliminates the need for a stuffing box and its inherent hysteresis.

It is an additional object of the present invention to provide an electrically operable control system of the type stated which can be used in both low pressure and high pressure fluid systems.

It is also an object of the present invention to provide a pulsed solenoid control valve of the type stated which substantially eliminates both uncontrolled axial and radial vibrations of the valve plunger.

It is another salient object of the present invention to provide a pulsed solenoid control valve of the type stated which is adaptable for use in bench-scale equipment, pilot-plant equipment and commercial process equipment.

It is still another object of the present invention to provide a pulsed solenoid control valve of the type stated which can be built into a small compact unit, which is relatively inexpensive to manufacture and has a high degree of reliability.

With the above and other objects in view, my invention resides in the novel features of form, construction, arrangement, and combination of parts presently described and pointed out in the claims.

Figure 4:
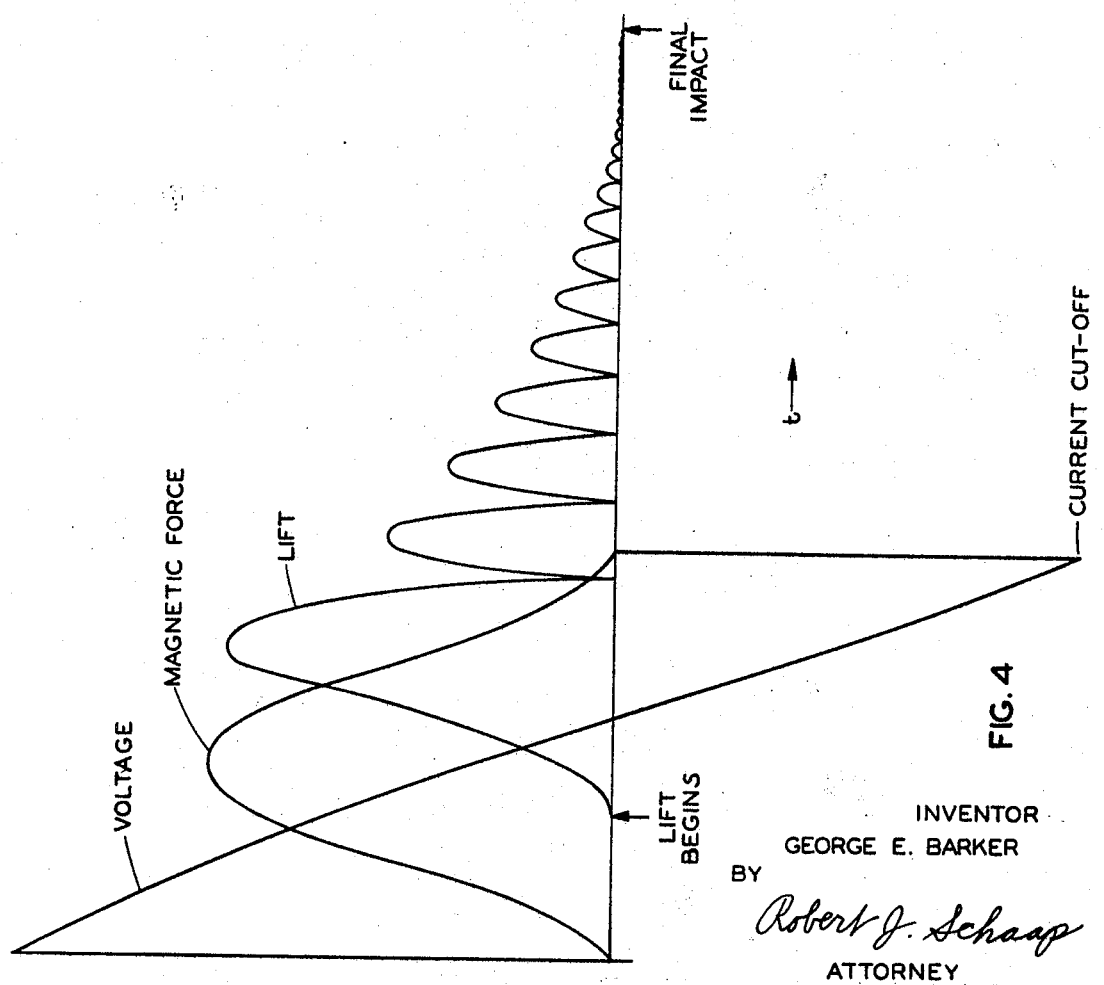

In the accompanying drawings (2 sheets):

FIGURE 1 is a vertical sectional view, partially broken away, of an electrically operated control valve constructed in accordance with and embodying the present invention;

FIGURES 2 and 3 are fragmentary sectional views taken along lines 2—2 and 3—3, respectively of FIGURE 1;

FIGURE 4 is a diagrammatic view of the rebound vibration, the voltage and magnetic force as a function of time of a valve which was not provided with the guide rings of the present invention; and FIGURE 5 is a diagrammatic view similar to the view of FIGURE 4 showing the axial vibration, the magnetic force and voltage as a function of time for a valve constructed in accordance with the present invention.

General description

Generally speaking, the present invention resides in an electrically operable control valve which is capable of modulating control action by varying the voltage supplied to the coil of the control valve. The valve is designed to control fluid flow in response to changes of a measured physical variable, such as liquid level. Consequently, the electrically operable control valve can find a wide variety of uses, succh as a liquid level controller, a differential pressure controller or a temperature controller. The valve is provided with inlet and outlet ports, the outlet port having a valve seat. A vibratory plunger shifts with respect to the valve seat for controlling the flow of fluid through the valve housing. The valve plunger is metallic and actuable by a solenoid coil which is associated with the valve housing and surrounds the plunger.

A control circuit of the type described in the aforementioned copending application is provided for measuring the changes in the measured physical variable. The control circuit generally includes a sensor for measuring the change of the sensed physical variable and a mechanism for converting the measured physical property change into a proportional resistance change. The control circuit also includes a relaxation oscillator which is designed to convert the proportional resistance change into a sequence of timed pulses. Finally, a silicon controlled rectifier is provided for transmitting current pulses in timed relationship to the solenoid coil for actuating the plunger. In effect, it is thereby possible to maintain controlled vibration of the plunger for regulating fluid flow in proportion to the change of the sensed physical variable.

The explanation of this flow control phenomenon involves a rather new control principle, namely, controlled mechanical vibration of the plunger at line frequency. This mechanical vibration is a forced vibration caused by the pulsating force exerted on the plunger by the solenoid coil. During the pulse cycle, the force exerted on the plunger starts from a zero level, reaches a maximum level, and returns to a zero level. If the average force exerted on the plunger by this pulsating voltage application is equal to or greater than the spring force which is designed to hold the plunger in a closed position, the plunger will snap open in a conventional solenoid-valve fashion. If however, the average force exerted on the plunger by the coil is less than the spring force, but the maximum force is greater than the spring force, then the plunger will be lifted from the valve seat during a portion of the pulse cycle. During the lift portion of the cycle, the motion of the plunger can then be described by conventional force-mass differential equations. The effective valve opening can then be conveniently described by the time integral of the vertical lift of the plunger.

Fixedly secured to the valve plunger is one or more flexible O rings which are designed to bear against the internal wall of the chamber in which the valve plunger shifts. The O rings remain in friction-tight engagement with the wall of the chamber and will flex during the axial shifting movement of the valve plunger. Preferably, an O ring should be employed near the upper end of the valve plunger and one should be employed near the lower end of the valve plunger. In this manner, the plunger will be prevented from engaging in any uncontrolled radial vibration and will shift only in response to the unbalance of forces creating the axial vibratory movement. The O rings are sufficiently thick so that they will flex for the full length of the shifting movement of the valve plunger. The valve plunger is further provided with an axial bore and a radial bore communicating with the axial bore for maintaining a fluid flow between the upper and lower ends of the chamber in which the valve plunger is disposed. Moreover, the use of the flexible O rings substantially eliminates the uncontrolled axial rebound vibrations of the valve plunger. Hence, the valve only has a meta-stable state of vibration.

*Detailed description*

Referring now in more detail and by reference characters to the drawings which illustrate practical embodiments of the present invention, A designates an electrically operated solenoid control valve substantially as shown in FIGURES 1 and 2. The control valve A is operatively connected to and operable by a control circuit which is more fully illustrated and described in detail in the aforementioned copending application.

The control valve A generally comprises an outer control valve housing 1 including a somewhat cylindrical coil housing 2. Disposed within the housing 2 is a helically wound cylindrical solenoid coil 3 and disposed upon opposite ends thereof are upper and lower insulating washers 4 and 5, respectively. The insulating washer 5 is facewise disposed on the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIGURE 1, it can be seen that the springs 8 are interposed between the upper surface of the flux plate 7 and the undersurface of the top wall forming part of the coil housing 2.

The coil housing 2 and the solenoid coil 3 are centrally apertured to accommodate a plunger tube assembly 9 which comprises a cylindrical tube 10 having an internal wall 10'. The plunger tube assembly 9 is disposed axially within the coil housing 2 and contains a central non-magnetic section surrounded by magnetic sections at each transverse end. Secured to the upper end of the tube 10 is a plug 11 which is retained by a nut 12, substantially as shown in FIGURE 1. The plug 11 projects inwardly into the tube 10 and at its lower end, is diametrally reduced in the provision of a downwardly extending boss 13, thereby providing an annular relief 14 for accommodating a compression spring 15. Integrally formed with and extending downwardly from the lower end of the boss 13 is a projection 16, the lower face of which serves as a plunger stop 17. Reciprocatively disposed within the tube 10 and being adapted for vibratory movement is a valve plunger 18 which has a relatively smooth annular side wall 19. At its upper end, the plunger 18 is milled to provide a plunger head 19'.

Threadedly secured to the lower end of the base plate 6 is a valve body 20 which is axially drilled from each of its transverse ends to form inlet and outlet ports 21, 22 respectively. The valve body 20 is also provided with a duct 23 communicating with a fluid chamber 24 formed by the tube 10. Communication is provided therebetween by an orifice 25 formed in an upstanding boss 26 integrally formed with the valve body 20. The fluid chamber 24 communicates with the outlet port 22 through a duct 27 which, in turn, communicates with the axial duct 23. The inlet port 21 is maintained in communication with the chamber 24 through a duct 28 formed in the valve body 20, substantially as shown in FIGURE 1. The upstanding boss 26 is machined with a flat head so that it suitably serves as a valve seat *s*.

The valve plunger 18 is internally bored from its bottom face to accommodate a Teflon disc 29 which is surrounded by a stainless steel ring 30. The seat material, such as the Teflon, has a strong effect on secondary or rebound vibrations of a vibrating plunger. In general, the secondary axial vibrations are undesirable inasmuch as they adversely affect the stability of the valve. Moreover, much of the noise associated with pulsed solenoid operation is produced by secondary or rebound vibrations. In connection with the present invention, it was found that a seat formed of Teflon produced the most desirable results of any material analyzed. Teflon possessed a high elastic co-efficient but which was sufficient for an adequately stable range of operation. The rebound vibrations were sufficiently negligible and it was found that the valve seat *s* had a rather extended life.

The valve plunger 18 is provided with upper and lower grooves spaced inwardly from the upper and lower ends thereof, for accommodating flexible O rings 31, 32. The O ring 31 is sufficiently wide to bear against the interior wall 10' and is frictionally held against the wall in this particular position. Similarly, the O ring 32 is sized with sufficient width to frictionally engage the interior wall of the threaded portion forming part of the valve body 20, in the manner as shown in FIGURE 1. Thus, as the plunger 18 shifts between its upper and lower poistions, the O rings will flex without changing their relative positions with respect to the remainder of the valve A. It has been found in connection with the present invention that the valve plunger 18 shifts no more than .005" at its maximum axial vibration. The O rings 31, 32 are sized so that they will flex during this axial shifting movement without changing their relative position with respect to the valve A. It has been found that when the O rings 31, 32 are formed with a thickness of approximately .070", they are capable of remaining in a relatively fixed position and yet providing sufficient flexibility for accommodating the movement of the valve plunger 18. In essence there is no sliding action, but there is a rolling action within the flexural limits of the O rings 31, 32 so that at least one portion of the peripheral surface of the rings 31, 32 will always remain in contact with the wall 10'. As the plunger 18 shifts away from its initial position a portion of the rings 31, 32 will be subjected to compression and a portion to elongation during flexing thereof.

The flexible O rings 31, 32 are preferably formed of either Buna-N rubber or of a fluoroelastomer rubber, such as the rubber sold under the trademark "Viton A." Each of these materials has been found to provide sufficient flexibility so that they are capable of withstanding the axial forces to change their positions in the plunger tube assembly 9 as the plunger 18 shifts axially with respect to the tube assembly 9.

In order to maintain fluid communication between the upper and lower ends of the chamber 24, the valve plunger 18 is provided with an axial duct 33 which communicates with a radial duct 34 at its lower end. Thus, fluid could pass from the lower end of the chamber 24 through the radial duct 34, and the axial duct 33 into the upper end of the chamber 24. In this manner, the fluid in the chamber 24 will not create any additional pressure forces which will add to the unbalance of forces across the valve plunger 18.

When the flexible O rings 31, 32 were eliminated, the valve plunger 18 appeared to have two stable vibration states for each power level of the solenoid coil 3. In this two-state vibration condition, transition from one state to the other state occurred within approximately 16 milliseconds and produced a flow offset of approximately 5 percent. When the flexible O rings were employed, it was found that only one vibration state existed and flow noise was substantially reduced. It is believed that this reduction of the two stable vibration states and elimination of transition therebetween was due to the maintaining of radial alignment of the valve plunger 18 within the tube assembly 9. Consequently, the flexible O rings 31, 32 provided a dampening of the uncontrolled radial vibrations.

It has been found that rebound vibrations of the valve plunger tend to materially limit the maximum flow attainable and hence the dynamic range of operation of the control valve. In the control valve described in the aforementioned copending application, the life of the valve seat was considered to be remarkable in view of the fact that the plunger was vibrating at at least 60 times per second. The long seat life was due to the result of low unbalanced forces on the plunger so that maximum seating pressure was well within the elastic range of the valve seat. However, the axial rebound vibrations of the plunger and the uncontrolled radial vibrations inevitably caused seat wear, thereby causing indentations of the Teflon material. It has been found that the flexible O rings 31, 32 of the present invention also substantially eliminate the uncontrolled axial rebound vibrations of the valve plunger, in addition to eliminating the uncontrolled radial vibrations of the valve plunger 18.

The valve A is also provided with a fitting 35 for accommodating a pair of leads 36 to the solenoid coil 3 in the manner as shown in FIGURE 1. The leads 35 are ultimately connected to the control circuit which is more fully illustrated and described in detail in the aforementioned copending application.

It has been found in connection with the present invention that the energy that was normally dissipated by the high amplitude, relatively slow vertical rebound vibrations of the valve plunger was converted through the use of the flexible O rings 31, 32 and absorbed by the O rings 31, 32. Consequently, the normal rebound vibrations of the valve plunger 18 have been substantially reduced. By reference to FIGURE 4, it can be seen that the rebound vibrations of the valve plunger in the valve described in the aforementioned copending patent application were fairly substantial. FIGURE 5, however, illustrates the course of the rebound vibrations of the valve plunger in the present invention. It can be seen that the rebound vibrations in the valve of the present invention are substantially reduced as a result of the flexible O rings 31, 32. With the elimination of these rebound vibrations, it has been found that it is now feasible to power the solenoid coil with a variable amplitude sine wave power such as a variac, without creating instability or flow noise. It should be understood that more highly efficient control action is obtained through the use of the control circuit C described in the aforementioned copending application, but that highly efficient results are also obtained by employment of a source of variable amplitude sine wave power.

The existence of the unique valve stability in pulsed solenoid operations can be explained by the fact that the valve plunger 18 is in a motionless state at the start of a force cycle. This motionless state provides the reason for the success in the use of a half-wave silicon controlled rectifier power source for obtaining effective control. In the device of the aforementioned copending application, amplitude control of a sine wave power source would not have been effective inasmuch as it would not be possible to obtain a quiescent period during the period of the rebound vibrations. By the employment of a silicon controlled rectifier power source in the device of the aforementioned copending application, the force pulse is followed by a long period, the quiescent period, or negative cycle in which no force pulse is produced by the solenoid. This allows the vibrations of the valve plunger to be extinguished prior to the next pulse. When compared to the use of sine wave power, an identical force pulse is produced during the negative cycle and it is necessary to have the vibrations extinguished before this cycle begins. Accordingly, heretofore it was necessary to obtain silicon controlled rectifier power for great dynamic range of a control valve. By eliminating the axial rebound vibration in accordance with the present invention, it has been found that it is possible to employ a sine wave power source for energization of the solenoid coil 3. Since the vibrations of the valve plunger rapidly extinguish themselves through both axial and radial vibration on the valve seat, the quiescent period or negative cycle is no longer required.

FIGURES 4 and 5 have been provided to illustrate the substantial elimination of the uncontrolled rebound vibrations. FIGURE 4 is obtained from a "blip" pattern of the valve described in the aforementioned copending application and as mentioned, compares the voltage force with the magnetic force and the lift of the valve plunger. This "blip" pattern describes a condition where the plunger is generating voltage during the quiescent period in the same manner as an electric motor. Since the main control circuit is de-energized immediately after the cut-off of the silicon controlled rectifier employed therein, there is an iron-loss load across the solenoid coil. This sudden change in the speed of the plunger at the impact with the valve seat produced a relatively large voltage "blip." Accordingly, measurements from an oscilloscope screen provide a desirable method of measuring the rebound constant.

FIGURE 5 illustrates the rebound vibration in the valve of the present invention. The same method which was used to measure the "blip" pattern in the valve of the copending application cannot be used to measure the "blip" pattern of the valve A in the present invention. As previously mentioned, the rebound vibrations are too small and occur too rapidly to measure accurately or depict on oscilloscope screen. Here again, the "blip" pattern showing the rebound vibrations of the valve plunger can be fairly accurately estimated and this estimation is presented in FIGURE 5. Moreover, it can be seen that the time of the final impact is materially shortened so that the need for a quiescent period between each succeeding force pulse is practically eliminated. Consequently, it can be seen that a variable amplitude sine-wave voltage source can be used without creating instability.

It should be understood that changes and modifications in the form, construction, arrangement and combination of parts presently described and pointed out may be substituted for those herein shown without departing from the nature and principle of my invention.

Having thus described my invention what I desire to claim and secure by Letters Patent is:

1. In a dithering solenoid actuated valve including a housing having a wall forming an internal chamber, said valve having a valve seat in alignment with said chamber, a valve plunger in said chamber capable of being moved away from and toward said seat in closurewise position, and electromagnetic means causing dithering action of said valve plunger; the improvement comprising at least one resilient guide ring circumferentially disposed about said plunger and being held in engagement with the interior surface of said wall forming an initial peripheral band of contact when said valve plunger is in a static condition, said guide ring being sufficiently resilient to dampen radial and undesirable axial vibrations of said valve plunger, said guide ring being sized to flex for the distance that said valve plunger moves with respect to said seat so that a portion of the guide ring remains in contact with said interior surface of said wall at the initial peripheral band of contact during the movement of said valve plunger and the resultant flexing of said guide ring.

2. In a dithering solenoid actuated valve including a housing having a wall forming an internal chamber, said valve having a valve seat in alignment with said chamber, a valve plunger in said chamber capable of being moved away from and toward said seat in closurewise position, and electromagnetic means causing dithering action of said valve plunger; the improvement comprising a plurality of axially spaced resilient guide rings circumferentially disposed about said plunger and being held in engagement with the interior surface of said wall forming initial peripheral bands of contact when said valve plunger is in a static condition, said guide rings being sufficiently resilient to dampen radial and undesirable axial vibrations of said valve plunger, said guide rings being sized to flex for the distance that said valve plunger moves with respect to said seat so that portions of each of the guide rings remain in contact with said interior surface of said wall at the initial peripheral bands of contact during the movement of said valve plunger and the resultant flexing of said guide rings.

3. In a dithering solenoid actuated valve including a housing having a wall forming an internal chamber, said valve having a valve seat in alignment with said chamber, a valve plunger in said chamber capable of being moved away from and toward said seat in closurewise position, and electromagnetic means causing dithering action of said valve plunger; the improvement comprising at least one resilient guide ring circumferentially disposed about said plunger and being held in engagement with the interior surface of said wall forming an initial peripheral band of contact when said valve plunger is in a static condition, said guide ring being sufficiently resilient to dampen radial and undesirable axial vibrations of said valve plunger, said guide ring being sized to flex for the distance that said valve plunger moves with respect to said seat so that a portion of the guide ring remains in contact with said interior surface of said wall at the initial peripheral band of contact during the movement of said valve plunger and the resultant flexing of said guide ring, said guide ring being held in frictional engagement with said plunger and the interior surface of said wall.

4. A dithering solenoid actuated valve comprising a valve housing, a wall in said housing and having an interior surface forming an internal chamber, said housing having a valve seat in approximate alignment with said chamber, a valve plunger shiftably disposed in said chamber and being shiftable away from and toward said seat, electromagnetic means operatively disposed about said wall and causing a dithering action of said valve plunger, and at least one resilient guide ring circumferentially disposed about said plunger and being held in engagement with the interior surface of said wall at a peripheral band of contact for dampening radial and undesirable axial vibrations of said valve plunger, said guide ring being sized to flex for the distance that said valve plunger moves with respect to said seat so that a portion of the guide ring at the peripheral band of contact remains in contact with said interior surface of said wall during the flexing of said guide ring.

5. The solenoid valve of claim 4 further characterized in that said valve plunger is circular in cross-section.

6. The solenoid valve of claim 4 further characterized in that said valve plunger shifts no more than 0.005 inch at maximum axial vibration.

7. The solenoid valve of claim 4 further characterized in that said guide ring has a thickness of approximately 0.070 inch.

8. The solenoid valve of claim 4 further characterized in that said guide ring is circular in cross-section.

9. A dithering solenoid actuated valve comprising a valve housing, a wall in said housing and having an interior surface forming an internal chamber, said housing having a valve seat in approximate alignment with said chamber, a valve plunger shiftably disposed in said chamber and being shiftable away from and toward said seat, electromagnetic means operatively disposed about said wall and causing a dithering action of said valve plunger, and a plurality of axially spaced resilient guide rings circumferentially disposed about said plunger and being held in engagement with the interior surface of said wall at peripheral bands of contact for dampening radial and undesirable axial vibrations of said valve plunger, said guide rings being sized to flex for the distance that said valve plunger moves with respect to said seat so that portions of each of the guide rings at the peripheral bands of contact remain in contact with said interior surface of said wall during the flexing of said guide rings.

10. A dithering solenoid actuated valve comprising a valve housing, a wall in said housing and having an interior surface forming an internal chamber, said housing having a valve seat in approximate alignment with said chamber, a valve plunger shiftably disposed in said chamber and being shiftable away from and toward said seat, electromagnetic means operatively disposed about said wall and causing a dithering action of said valve plunger, and at least one resilient guide ring circumferentially disposed about said plunger and being held in engagement with the interior surface of said wall at a peripheral band of contact for dampening radial and undesirable axial vibrations of said valve plunger, said guide ring being sized to flex for the distance that said valve plunger moves with respect to said seat so that a portion of the guide ring at the peripheral band of contact remains in contact with said interior surface of said wall during the flexing of said guide ring, said guide ring being held in frictional engagement with said plunger and the interior surface of said wall.

11. A dynamically operable control device comprising a housing provided with an internal chamber having an internal wall, a movable element disposed within said internal chamber and being axially shiftable between a first and second end position, means associated with said housing for applying a force pulse to said movable element to bias said element in a second direction toward said second end position, means for regulating the size of said force pulse to produce a net unbalance of forces on the movable element to cause the movable element to move toward the second end position, and at least one resilient axial guide ring surrounding said movable element and being held in engagement with said element and the internal wall of said internal chamber and forming an initial peripheral band of contact when said movable element is in a static condition, said guide ring being sized to flex for the distance that said movable element moves in the first and second direction so that a portion of the guide ring remains in contact with said internal wall at the initial peripheral band of contact during movement of said movable element and the resultant flexing of said guide ring.

12. A dynamically operable control device comprising a housing provided with an internal chamber having an internal wall, a movable element disposed within said internal chamber and being axially shiftable between a first and second end position, means associated with said housing for applying a force pulse to said movable element to bias said element in a second direction toward said second end position, means for regulating the size of said force pulse to produce a net unbalance of forces on the movable element to cause the movable element to move toward the second end position, and a plurality of axially spaced resilient axial guide rings surrounding said movable element and being held in engagement with said element and the internal wall of said internal chamber forming initial peripheral bands of contact when said movable element is in a static condition, said guide rings being sized to flex for the distance that said movable element moves in the first and second direction so that portions of each of the guide rings remain in contact with said wall at the initial peripheral bands of contact during movement of said movable element and the resultant flexing of said guide rings.

13. A dynamically operable control device comprising a housing provided with an internal chamber having an internal wall, a movable element disposed within said internal chamber and being axially shiftable between a first and second end position, means associated with said housing for applying a force pulse to said movable element to bias said element in a second direction toward said second end position, means for regulating the size of said force pulse to produce a net unbalance of forces on the movable element to cause the movable element to move toward the second end position, at least one resilient axial guide ring surrounding said movable element and being held in engagement with said element and the internal wall of said internal chamber and forming an initial peripheral band of contact when said movable element is in a static condition, said guide ring being sized to flex for the distance that said movable element moves in the first and second direction so that a portion of the guide ring remains in contact with said internal wall at the initial peripheral band of contact during movement of said movable element and the resultant flexing of said guide ring, and vent means formed in said movable element for providing fluid communication between opposite ends of said chamber on opposite sides of the outermost guide rings.

14. A dynamically operable control device comprising a housing provided with an internal chamber having an internal wall, a movable element disposed within said internal chamber and being axially shiftable between a first and second end position, means associated with said housing for applying a force pulse to said movable element to bias said element in a second direction toward said second end position, means for regulating the size of said force pulse to produce a net unbalance of forces on the movable element to cause the movable element to move toward the second end position, and at least one resilient axial guide ring surrounding said movable element and being held in friction-tight engagement with said element and the internal wall of said internal chamber and forming an initial peripheral band of contact when said movable element is in a static condition, said guide ring being sized to flex for the distance that said movable element moves in the first and second direction so that a portion of the guide ring remains in contact with said internal wall at the initial peripheral band of contact during movement of said movable element and the resultant flexing of said guide ring.

References Cited

UNITED STATES PATENTS

| | | | |
|---|---|---|---|
| 2,610,644 | 9/1952 | Carlisle et al. | 251—64 X |
| 2,827,077 | 3/1958 | Mitchell | 251—64 X |
| 2,931,233 | 4/1960 | Griswold | 335—271 X |
| 3,001,757 | 9/1961 | Ball | 251—140 |
| 3,094,132 | 6/1963 | Byloff | 137—330 X |
| 3,098,595 | 7/1963 | Shelton | 137—330 X |
| 3,098,635 | 7/1963 | Delaporte et al. | 251—129 X |

M. CARY NELSON, *Primary Examiner.*

R. C. MILLER, *Assistant Examiner.*

U.S. Cl. X.R.

251—129